United States Patent [19]
Pearson et al.

[11] Patent Number: 5,180,132
[45] Date of Patent: Jan. 19, 1993

[54] SELF-SETTING SUCTION HOLDER DEVICE

[76] Inventors: Scott A. Pearson, MIT Room E53-394; Jin Oh, 545 Technology Square #804 JSO, both of Cambridge, Mass. 02139; Richard A. Lethin, 58 Reservoir St., Cambridge, Mass. 02138; Eric F. Howlett, 362A Shark Ave., Groton, Conn. 06340

[21] Appl. No.: 796,338
[22] Filed: Nov. 22, 1991
[51] Int. Cl.⁵ ............................................ A45D 42/14
[52] U.S. Cl. ............................ 248/362; 248/205.5; 248/309.3; 248/683
[58] Field of Search ............... 248/362, 363, 205.5, 248/205.7, 205.8, 206.2, 683, 309.3, 311.2, 205.6, 205.9, 346.1; 220/737

[56] References Cited

U.S. PATENT DOCUMENTS

| | | |
|---|---|---|
| 1,587,874 | 6/1926 | Strickland . |
| 2,933,280 | 4/1960 | Hard ................................. 248/362 |
| 2,963,256 | 12/1960 | Borah .............................. 248/362 X |
| 3,277,220 | 10/1966 | Plymale et al. ............... 248/311.2 X |
| 3,524,614 | 8/1970 | Sorth . |
| 4,756,497 | 7/1988 | Lan ................................... 248/205.9 |
| 4,759,525 | 7/1988 | Cross et al. . |

FOREIGN PATENT DOCUMENTS

| | | |
|---|---|---|
| 199159 | 6/1923 | United Kingdom . |
| 358589 | 10/1931 | United Kingdom . |
| 1008093 | 10/1965 | United Kingdom . |

Primary Examiner—Ramon O. Ramirez
Attorney, Agent, or Firm—Sughrue, Mion, Zinn, Macpeak & Seas

[57] ABSTRACT

A suction device has a flexible cup member whose lower surface defines a flat central zone surrounded by an annular zone sloping inwardly and upwardly at an angle of 2° to 10° with the central zone. An article holder, such as a beverage can receptacle, has a rigid circular base centrally secured to the upper surface of the cup member, opposite the central zone thereof. Any tilting or lifting of the article holder attendantly tilts or pulls the central zone of the cup member upwardly, thereby establishing a retentive suction in a self-setting manner.

15 Claims, 1 Drawing Sheet

SELF-SETTING SUCTION HOLDER DEVICE

BACKGROUND OF THE INVENTION

1. Field of the Invention

This invention relates to a holding device for a fluid container, or the like. In particular, the invention is a suction holding device that is self-setting by virtue of random movement of the object to be secured and has a releasing means that is easily operated.

2. Description of the Related Art

It is often desirable to secure open beverage containers to a moving surface, such as a deck, dashboard, or table in a boat or recreational vehicle. While it is desirable to prevent sliding and tipping of the container due to acceleration, i.e. changes in the speed, orientation or direction of the vehicle, it is of course desirable to have the ability to lift the container for the purpose of drinking or pouring from it. Previously, various attempts have been made to design devices that would accomplish these somewhat contradictory purposes.

It is known to coat the bottoms of beverage containers with a non-slip material to reduce slippage. However, this significantly increases the cost of manufacture of the container and, in addition, does not address the problem of tipping. In fact, such an arrangement actually increases the tendency of the container to overturn because a sheer force acting on the container at its center of mass (which is located above its support surface) will cause a rotational moment about the non-slip interface. A separate coaster having a non-slip material reduces the cost of the container, but does not address the other limitations mentioned above.

Insulated beverage holder "sleeves" have also been used to reduce slippage of beverage containers on movable surfaces. Such a beverage holder is usually constructed of polystyrene and is configured to essentially surround the container. Such a device may have a non-slip surface to decrease the likelihood of slippage. In addition, a base of increased diameter may serve to somewhat increase the stability of the container against tipping. However, because there is necessarily a thickness associated with the base portion, such a device serves to raise the center of gravity of the container to attendantly increase the likelihood of spillage.

More recently, it has been known to utilize a suction device to secure a beverage container to a surface. Such a device is disclosed in U.S. Pat. No. 4,795,525 issued to Cross et al. The holding device disclosed therein consists essentially of an initially flat, flexible disc secured to the concave bottom of an aluminum beverage can. The diameter of the disc is larger than that of the can. The disk is deformed into a concave shape in conformance with the bottom surface of the can. When placed upon a table or the like, the weight of the can sets a suction or vacuum chamber created by the convex shape of the disk and its flexible edges that protrude from the peripheral edges of the can. The non-slip characteristics of the disk minimize slippage of the can. In addition, the protruding edges of the disk add stability to the can.

However, the device disclosed by Cross has several limitations. In particular, this device is only suitable for use with a container having a concave bottom. In addition, since the suction chamber has a relatively large volume the device requires a significant displacement due to the weight of the can in order to set the suction. By the same token, it is difficult to break the seal thereof. In order to overcome this, a vent hole or passage may be provided to eliminate the sealing effect and thus the suction holding ability of the device. The vented Cross device can then be lifted without any manipulation of the coaster.

SUMMARY OF THE INVENTION

In light of the above, it is an object of this invention to provide a suction holding device that is self-setting by means other than the weight of the container to be held. In addition, it is an object of the invention to provide a suction holding device that is easily released without the need for only a simple effort by the operator.

It is a further object of the invention to provide a holding device that prevents slippage and spillage of a beverage container as well as protection to the surface supporting it. Finally, while the invention is described through a specific embodiment that relates to a beverage holder, it is to be understood that the invention has broader and equally useful applications relating to removably securing any device to a relatively flat surface.

To achieve the above-mentioned objectives, the invention has a flexible base whose bottom surface defines a slightly concave surface preferably consisting of a flat central portion and an annular portion intersecting the central portion at a small acute angle. An article holder is secured to a central portion of a top surface of the base. This novel construction provides for a very small suction chamber to be defined between the base and a supporting surface. The flexibility of the base, when combined with the above-mentioned novel geometric configuration, allows the base to be self-setting by virtue of motion of the article holder attached to the base.

The nature, principle and utility of the invention will become more apparent from the following detailed description of its structure and operation with reference to the attached drawings.

DETAILED DESCRIPTION OF THE PREFERRED EMBODIMENT

Figure 1:
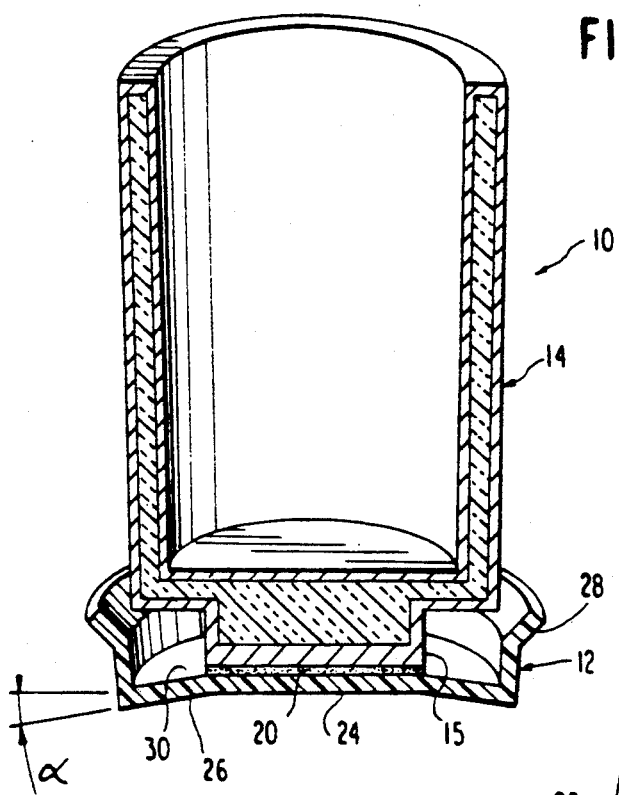
FIG. 1 is a sectional view of a preferred embodiment.

FIG. 1 illustrates a preferred embodiment of the invention in cross section. Beverage cup holding device 10 consists of two portions, beverage cup 14 and base portion 12. Base portion 12 may be constructed of a silicone rubber material, or any other highly flexible material. Preferably, base portion 12 is constructed of any material having a durometer hardness range from 20A to 80A, inclusive, with a hardness of about 50A being preferred. Beverage cup 14 is preferably of a double wall construction with an insulation material disposed therein. Such a construction is well known. Of course, beverage cup 14 can be of virtually any design and construction suitable for containing or attaching a beverage can, or the like. In addition, beverage cup 14 could be replaced by any device that must be removably attached to a surface.

Figure 2:
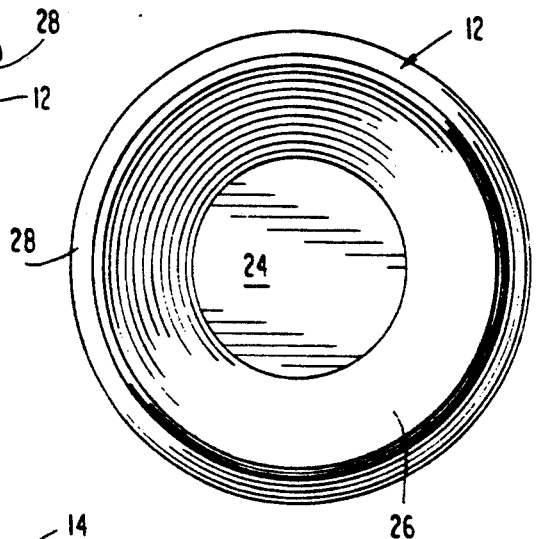
FIG. 2 illustrates the bottom surface of the base member of the preferred embodiment.

Base portion 12 is attached to beverage cup 14, at narrowed bottom portion 15, by adhesive layer 20. Any suitable method of attachment may be utilized, however. It is desirable that bottom portion 15 be attached to base portion 12 over substantially the entire lower surface of bottom portion 15. The reason for this will become apparent from the explanation of operation below. Base portion 12 is substantially round when viewed from the bottom (see FIG. 2). The bottom surface of base portion 12 has a substantially flat central portion 24 and an annular portion 26 that extends from central portion 24 at angle α. It has been found that the present invention operates most consistently when α is between 2 and 10 degrees, inclusive. Annular rim 28 extends from an outer periphery of base portion 12 in a substantially normal direction to inner surface 30 of base portion 12.

In operation, base portion 12 of holding device 10 is placed upon a substantially flat support surface upon which holding device 10 is to be secured. Because of its high flexibility, base portion 12 will conform to the surface and create a sealed suction chamber defined by central portion 24, annular ring 26 and the support surface, thus automatically adhering to the surface. No external "setting" force need be applied when placed on a relatively horizontal surface. This is apparently so because the flexibility of base portion 12, combined with the small volume of the suction chamber, by virtue of its unique geometry, causes motions that tend to increase the chamber volume to thwarted because of the positive annular seal created by annular portion 26 when pressure in the chamber is decreased. However motions that tend to decrease the chamber volume are not opposed because annular portion 26 is allowed to flex outwardly when pressure in the chamber is increased. This phenomenon creates a unidirectional ratchet effect of air flow out of the chamber that occurs by virtue of random motions of beverage cup 14. Accordingly, the cup will tend to continually adhere to surfaces even when there are slow leaks out of the chamber, for example, in the case of a somewhat porous or rough surface.

Figure 3:
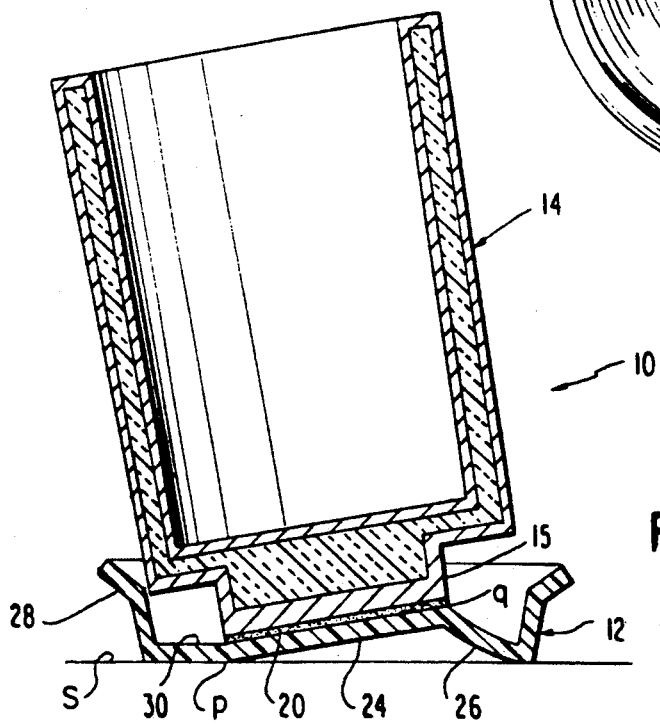
FIG. 3 illustrates the preferred embodiment, in cross section, when subjected to a lateral force which tends to tip the unit.

Also, because the center of gravity of beverage cup 14 is located at a position above base portion 12, holding device 10 is apparently able to translate non-vertical body forces into a torque component acting at a pivot point on base portion 12. Such a situation is illustrated in FIG. 3. It can be seen that when beverage cup 14 is subjected to a sheer force, pivot point p will be located at a point on the circumference of narrowed bottom portion 15. Accordingly, at point q, upper surface 30 of base portion 12 will be lifted relative to surface S upon which the device is placed. This motion tends to create a restoring vacuum. This feature of the invention increases its potential to resist forces having a strong shear component. This is so because frictional force (shear) is proportional to normal force (suction).

It should be emphasized that the vacuum forces are only established in the chamber when a displacement force serves to increase the volume of chamber in the above-described manner or when random forces activate the unidirectional ratchet effect, also described above. The suction need not be established by an initial external force, or even the weight of the device itself. This fact is especially important in applications of the invention where there is not any substantial weight to the device to be held, or where the device is to be held to a nonhorizontal surface. In addition, because of the small acute angle α, annular portion 26 remains in constant flexible contact with the surface so as to maintain an adequate seal, even through the above-mentioned disturbances. Finally, the novel design of the invention establishes a suction chamber that has a very small initial volume. Accordingly, since the pressure inside the chamber is proportional to the volume thereof, the pressure can be drastically decreased, so as to approach zero, by virtue of a small displacement which proportionately increases the volume of the chamber to a great degree.

The flexibility of base portion 12, when combined with the small volume vacuum chamber formed via acute angle α between central portion 24 and annular portion 26, yields a device that maintains its annular seal, in the manner described above, through external disturbances without the need for any downward forces to be applied by the user. In addition, rim 28 is positioned in such a manner so as to allow for easy release of the seal of the chamber by the touch of a finger when in a natural drinking position.

Any movement of rim 28 will sufficiently lift an edge of annular portion 26 so as to release its seal and eliminate the suction in the chamber. Accordingly, beverage cup 14 can be easily lifted when desired. Of course, rim 28 can be replaced by a lever or other type of salient portion used for releasing purposes if the holding device is utilized in other applications.

The design parameters of the subject invention may vary. For example, the relative diameters of annular portion 26 and central portion 24 may vary depending on the flexibility of the material utilized in base portion 12 and the size of beverage holder 14 and narrowed portion 15 as well as other specific application variables. Also, the bottom surface of base portion 12 can have a variety of configurations as long as a small, slightly concave area is defined on the bottom surface. For example, the bottom surface could have a dome-shaped configuration with a large radius of curvature.

While the present invention has been described through a preferred embodiment, it is understood that this embodiment may be modified in various ways without departing from the scope of the present invention a recited in the appended claims.

What is claimed is:

1. A self-setting suction holder device, comprising:
   a) a flexible, circular, substantially planar base member adapted to be placed on a substantially flat, generally horizontal surface,
   b) an article holder centrally disposed on the base member and upstanding therefrom, said article holder defining a rigid lower surface having at least a planar outer periphery,
   c) means joining said lower surface of the article holder to a central portion of an upper surface of the base member such that upon any tilting of the article holder an edge of said lower surface bears against and pivots on the upper surface of the base member to attendantly tilt said central portion of the base member upwardly and implement a concave deformation thereof, thereby establishing a suction to adhere the base member and attached article holder to said flat surface, and
   d) means integral with the base member for preventing the establishment of said suction to enable the removal of the article holder from said flat surface.

2. A suction holder device according to claim 1, wherein a bottom surface of said base member has a concave portion.

3. A suction holder device according to claim 2, wherein said bottom surface of said base member defines:
a) a flat central zone coextensive with said central portion of the upper surface, but opposite thereto, and
b) an annular zone surrounding the central zone and having, in a radial direction, an inwardly and upwardly directed slope lying at a relatively small acute angle to said flat central zone.

4. A suction holder device according to claim 3, wherein said small acute angle has a value of from 2° to 10°.

5. A suction holder device according to claim 2, wherein a cross section of said bottom surface is shaped as an arc having a radius of curvature that is substantially larger than a diameter of said base member.

6. A suction holder device according to claim 1, wherein said article holder comprises a hollow cylindrical receptacle upstanding from a downwardly extending, rigid pedestal, coaxial therewith, and having a larger diameter than said pedestal, a bottom surface of the pedestal comprising said lower surface of the article holder.

7. A suction holder device according to claim 1, wherein said preventing means comprises an annular lip upstanding from an outer periphery of the base member, and adapted to be bent inwardly by a finger of a user.

8. A suction holder device according to claim 2, wherein said base member is constructed of a material having a durometer hardness between 20A and 80A.

9. A suction holder device according to claim 6, wherein said cylindrical receptacle has a two wall configuration with an insulating material displaced in a cavity defined by said two walls.

10. A suction holder device, comprising:
a flexible circular base member having a substantially planar lower surface,
an article holder attached to an upper surface of said base member,
said lower surface being in flexible contact with a supporting surface when said base member is placed on said supporting surface so as to allow air to be forced out of a suction chamber when said base member is urged toward said supporting surface while prohibiting air from entering said chamber when said base member is urged away from said supporting surface, said chamber being defined by said lower surface and said supporting surface, and
a releasing device, integrally formed with said base member, for selectively preventing the establishment of suction in said chamber, wherein said lower surface of the base member defines:
a) a flat central zone, and
b) an annular zone surrounding said central zone and having, in a radial direction, an inwardly and upwardly directed slope lying at a relatively small acute angle to said flat central zone.

11. A suction holder device according to claim 10, wherein said small acute angle has a value of from 2° to 10°.

12. A suction holder device according to claim 10, wherein said releasing device comprises an annular lip upstanding from an outer periphery of the base member, and adapted to be bent inwardly by a finger of a user.

13. A suction holder device according to claim 10, wherein said base member is constructed of a material having a durometer hardness between 20A and 80A, inclusive.

14. A suction holder device according to claim 10, wherein said article holder comprises a hollow cylindrical receptacle upstanding from a downwardly extending, rigid pedestal, coaxial therewith, and having a larger diameter than said pedestal, a bottom surface of the pedestal being attached to said upper surface.

15. A suction holder device, comprising:
a flexible circular base member having a substantially planar lower surface,
an article holder attached to an upper surface of said base member,
said lower surface being in flexible contact with a supporting surface when said base member is placed on said supporting surface so as to allow air to be forced out of a suction chamber when said base member is urged toward said supporting surface while prohibiting air from entering said chamber when said base member is urged away from said supporting surface, said chamber being defined by said lower surface and said supporting surface, and
a releasing device, integrally formed with said base member, for selectively preventing the establishment of suction in said chamber, wherein said article holder comprises a hollow cylindrical receptacle upstanding from a downwardly extending, rigid pedestal, coaxial therewith, and having a larger diameter than said pedestal, a bottom surface of the pedestal being attached to said upper surface.

* * * * *